June 19, 1928.　　　R. E. MARSTON　　　1,674,292
VEHICLE SHOCK ABSORBER
Filed Sept. 29, 1927
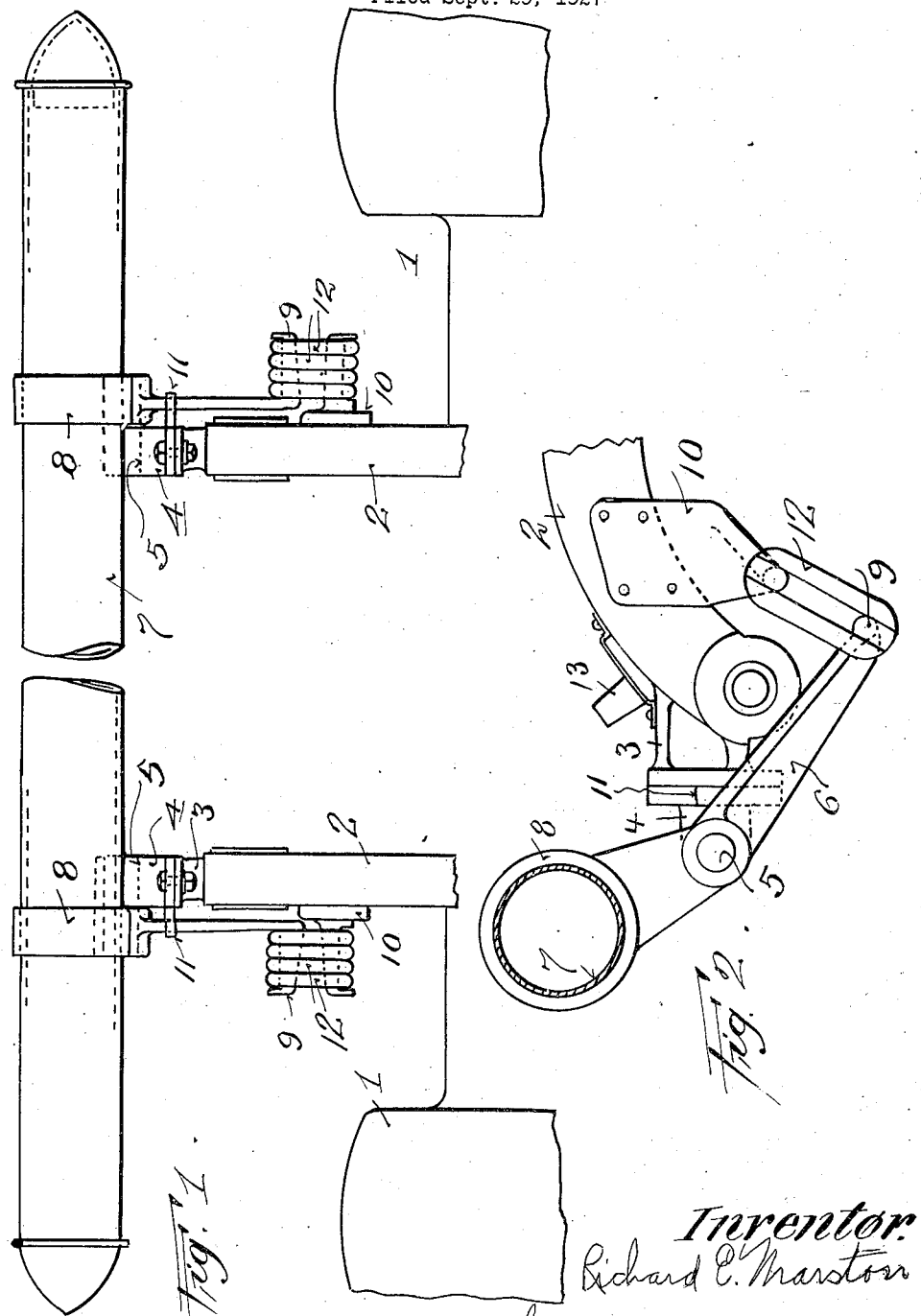
Inventor.
Richard E. Marston
By his Attorneys
Darby & Darby Patented June 19, 1928.

1,674,292

UNITED STATES PATENT OFFICE.

RICHARD E. MARSTON, OF FAIRPORT, NEW YORK, ASSIGNOR, BY MESNE ASSIGNMENTS, TO JAMES T. BRYAN, OF GARDEN CITY, LONG ISLAND, NEW YORK.

VEHICLE SHOCK ABSORBER.

Application filed September 29, 1927. Serial No. 222,765.

This invention relates to a device for absorbing shocks when a vehicle strikes an object.

One of the objects of this invention is to provide a shock absorbing buffer construction for land vehicles which is intended to absorb the shocks resulting from collisions, etc. rather than to transmit them to the chassis and body of the vehicle.

A further object of this invention is the provision of a shock absorbing buffer or bumper for land vehicles which employs a plurality of rubber strands for absorbing the shocks.

A further object of this invention is the provision of a pivoted buffer bar mounted on the body of a vehicle in such a manner as to be movable with respect thereto against the resistance of extensible members such as rubber cords or strands when the buffer bar meets with an object.

A further object of this invention is to provide resilient stops against which the buffer bar may strike when it receives unusually severe shocks.

A still further object of the invention contemplates the construction of a bumper or vehicle protecting device which is simple in construction and comprising relatively few parts adapted to be cheaply manufactured and adapted for severe usage.

These and many other objects are secured by means of the present invention.

This invention resides substantially in the construction, combination, arrangement and relative location of parts as will be pointed out in the following disclosure.

Referring to the drawings,

Figure 1 represents a top plan of the forward end of a vehicle employing the bumper of my invention with the major portion of the vehicle not shown;

Fig. 2 is a side elevational view of means employed for supporting the bumper on the chassis and showing the bumper bar in cross section.

In the usual forms of bumpers as now used on land vehicles, some form of relatively stiff spring construction is employed which, while tending to absorb shocks, do, in fact, transmit a considerable portion of them to the vehicle itself. The present invention contemplates construction which permits of realizing a more complete absorption of the shocks without transmitting them to the vehicle body.

Referring to the drawings a portion of the vehicle fenders is shown at 1 and the forward end of the chassis is shown as comprising the side members or beams 2. Mounted on the forward end of the beams 2 are short rugged extensions 3 to which are bolted the members 4 which support short pivot pins 5. Pivotally mounted on these pins are the arms 6 on the upper outer end of which is mounted a buffer bar 7 within the collars 8 which may be formed, if desired, integral with the arms 6. The other ends of the arms 6 are provided with right angle extensions 9 as appears clearly in Fig. 1. Short brackets 10 extend to right angles to the frame members 2 and adjacent to and parallel with the extensions 9. The members 4 are provided with short projections 11 which extend over the top of the arms 6 to limit the upward movement (Fig. 2) of these arms. At 12 are shown a plurality of rubber strands or cords encircling the projections 9 and 10. These rubber members 12 may comprise a plurality of closed loops or they may be made up of a single continuous or discontinuous rubber cord. At 13 is shown a rubber bumper which may or not be used for limiting the backward swing of the buffer bar 7 when it strikes an object with unusual violence.

As will be apparent from the foregoing description when the buffer bar strikes an object it tends to swing backwardly (Fig. 2) on the pivot pins 5 tending to stretch the rubber member 12. When the buffer bar is at rest in its normal position, the stops 11 will hold it there. It is, of course, understood that the rubber cords 12 will be under some tension when the bar is in normal position.

I am aware that many changes in the details of construction and the relative arrangement of parts will readily occur to those skilled in the art and I do not desire to be strictly limited to my disclosure which was made for purposes of illustration. For example, it is apparent that the buffer bar could be mounted for sliding movement with respect to the vehicle body rather than for moving about a pivot point, I do not therefore desire to be limited except as required by the scope of my appended claims.

What I seek to secure by United States Letters Patent is:

1. In a shock receiving member for a vehicle, the combination with a buffer member mounted on the vehicle adapted for movement upon striking an object of tension members for resisting the movement of said buffer member, said tension members comprising closed loops of rubber cord.

2. The combination with a vehicle, of a buffer member pivoted thereon of rubber cords for resisting the movement of said member on its pivots when it strikes an object.

3. The combination with a vehicle spring suspension, of a shock absorbing member mounted thereon for relative movement therewith and rubber tension members for resisting said relative movement.

4. In a shock absorbing device, the combination with a vehicle having a chassis of a buffer bar pivotally mounted on said chassis and adapted to be moved on said pivots when coming into contact with an object and rubber cords adapted to resist said movement by being placed under tension.

5. A vehicle protective device comprising a rigid member movably mounted on the vehicle and rubber loop elements secured to the vehicle and said rigid member to resist the movement of said rigid member.

6. A vehicle protective device comprising a rigid member movably mounted on the vehicle and a plurality of rubber cords secured to the vehicle and said rigid member to resist the movement of said rigid member.

7. In a vehicle protective device, the combination with a vehicle chassis of a buffer member pivotally mounted on said chassis and a plurality of rubber cords under tension to resist movement of said member said cords being attached to said chassis and to said buffer member.

8. The combination with a vehicle, of a buffer bar having a plurality of arms thereon, members on said vehicle for pivotally supporting said arms and bar and rubber tension bands attached to said extensions and vehicle to resist pivotal movement of said bar and arms.

In testimony whereof I have hereunto set my hand on this 24th day of September A. D., 1927.

RICHARD E. MARSTON.